No. 700,807. Patented May 27, 1902.
C. H. PALMER & J. W. DENMEAD.
MACHINE FOR MAKING PAPER BOX BLANKS.
(Application filed Dec. 21, 1901.)
(No Model.) 7 Sheets—Sheet 1.

Fig. 1.

Witnesses:
Walter Bouman
Maude Grisler

Inventors:
Charles H. Palmer,
John W. Denmead,
by Humphrey & Humphrey,
Attorneys.

Fig. 2.

No. 700,807. Patented May 27, 1902.
C. H. PALMER & J. W. DENMEAD.
MACHINE FOR MAKING PAPER BOX BLANKS.
(Application filed Dec. 21, 1901.)

(No Model.) 7 Sheets—Sheet 3.

Fig.3.

Witnesses:
Walter Bauman
Maude Gmeler

Inventors:
Charles H. Palmer,
John W. Denmead,
by Humphrey & Humphrey,
Attorneys.

No. 700,807. Patented May 27, 1902.
C. H. PALMER & J. W. DENMEAD.
MACHINE FOR MAKING PAPER BOX BLANKS.
(Application filed Dec. 21, 1901.)

(No Model.) 7 Sheets—Sheet 5.

Witnesses:
Walter Bowman
Maude Gmiler

Inventors:
Charles H. Palmer,
John W. Denmead,
By Humphrey & Humphrey,
Attorneys.

No. 700,807. Patented May 27, 1902.
C. H. PALMER & J. W. DENMEAD.
MACHINE FOR MAKING PAPER BOX BLANKS.
(Application filed Dec. 21, 1901.)

(No Model.) 7 Sheets—Sheet 6.

Witnesses:
Walter Bowman
Maude Ginsler

Inventors:
Charles H. Palmer,
John W. Denmead,
by Humphrey & Humphrey,
Attorneys.

THE NORRIS PETERS CO., PHOTO-LITHO., WASHINGTON, D. C.

No. 700,807. Patented May 27, 1902.
C. H. PALMER & J. W. DENMEAD.
MACHINE FOR MAKING PAPER BOX BLANKS.
(Application filed Dec. 21, 1901.)
(No Model.) 7 Sheets—Sheet 7.

Fig.11.

Witnesses: Inventors:
Walter Bowman Charles H. Palmer,
Maude Grisler John W. Denmead,
by Humphrey & Humphrey,
Attorneys.

UNITED STATES PATENT OFFICE.

CHARLES H. PALMER AND JOHN W. DENMEAD, OF AKRON, OHIO.

MACHINE FOR MAKING PAPER-BOX BLANKS.

SPECIFICATION forming part of Letters Patent No. 700,807, dated May 27, 1902.

Application filed December 21, 1901. Serial No. 86,810. (No model.)

*To all whom it may concern:*

Be it known that we, CHARLES H. PALMER and JOHN W. DENMEAD, citizens of the United States, residing at Akron, in the county of Summit and State of Ohio, have invented a certain new and useful Improvement in Machines for Making Paper-Box Blanks, of which the following is a specification.

Our invention has relation to machines for the automatic manufacturing and accurate printing of paper blanks suitable for subsequent manufacture into paper boxes to be used in holding various articles of commerce.

It has for its objects the production of a machine which shall manufacture such blanks from a continuous strip of material, cut said blanks along desired lines, print the same with a single or a plurality of colors, and afterward deliver them in a suitable place for removal.

To the aforesaid objects our invention consists in the peculiar and novel construction, combination, and arrangement of the various parts hereinafter described and then specifically claimed, reference being had to the accompanying drawings, forming a part of this specification.

In the accompanying drawings, in which similar reference-numerals indicate like parts in the different figures.

Figure 1:
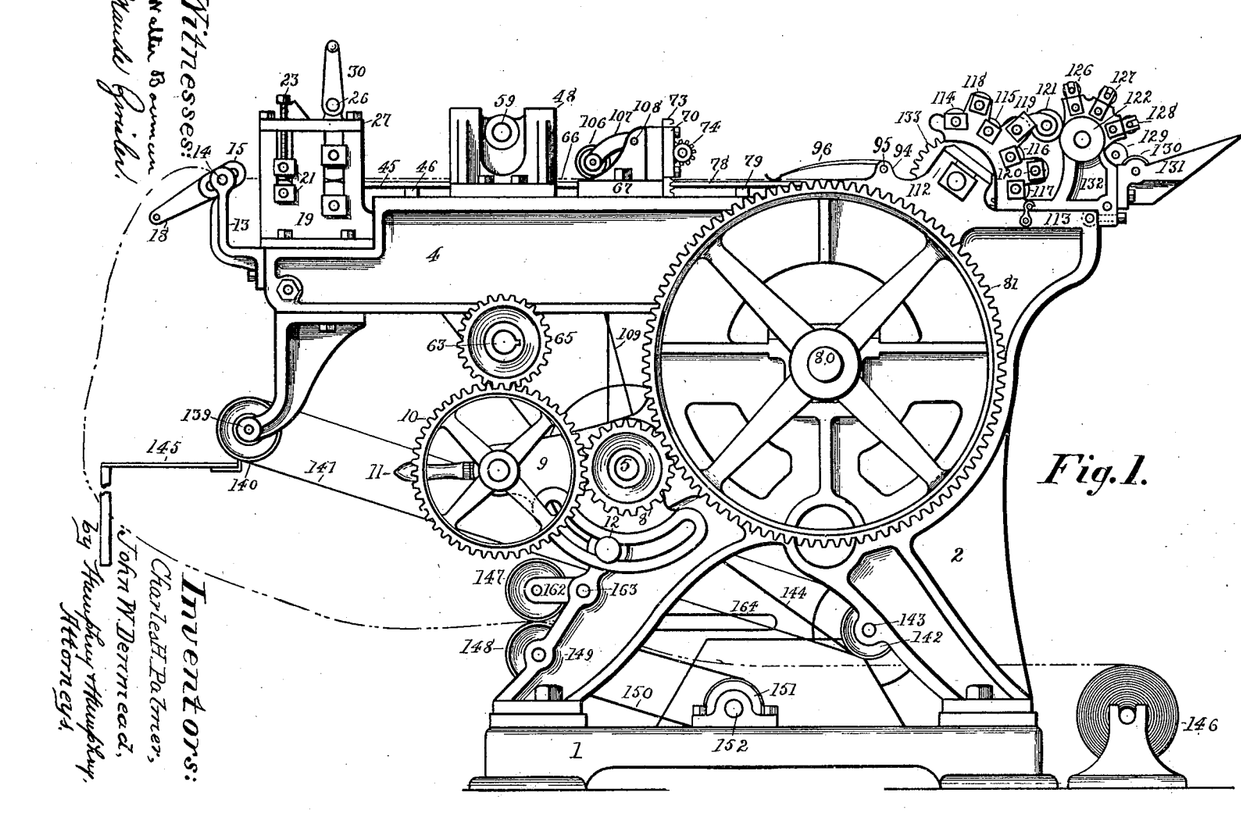
Figure 1 is a side elevation of our improved machine.

Referring to the drawings, 1 is a bed-plate, upon which are bolted two upright frames 2 3, the frame 2 being on what will hereinafter be designated as the "right" side of the machine and the frame 3 being on what is known as the "left" side of the machine. In arriving at the designation of these sides the observer is supposed to stand at the left of the machine in Fig. 1 or at the bottom in Fig. 3. These frames consist of a main body portion and with extended horizontal ways.

Mounted transversely in the main portion of the frames 2 and 3 is the main driving-shaft 5, bearing tight and loose pulleys 6 and 7. On the right side of the frame the shaft 5 bears a tight spur-pinion 8, arranged to rotate with said shaft. Pivoted on said shaft between said gear and the frame is a rocking bracket 9, bearing revolubly mounted thereon an idler spur-pinion 10, placed at such a distance from the pinion 8 as to constantly mesh therewith. The bracket 9 bears at its free end a handle 11, by which it may be moved. This bracket has in its lower portion a slot concentric with the center of the main driving-shaft 5, through which passes a bolt 12, which also passes through an opening in the frame, by which the bracket is held fixedly in a desired place.

Mounted on the left end of the frames 2 and 3 of the machine is a pair of upright brackets 13, having mounted therein short stub-shafts 14, which bear on their inner ends adjacent to the brackets T-heads 15, extending between which are two parallel rods 16, slightly separated from each other, one of which bears a pair of guide-collars 17 to keep the paper truly in the center when passing between the rods 16. The end of the stub-shaft 14, passing through the bracket on the left side of the frame, bears a handle 18, by which the two rods 16 may be rotated about each other and about the common center of the stub-shafts 14. The object of these two rods is to remove from the paper the constant tendency to curl which is acquired by paper being rolled, and in operation the paper is passed between the rod 16, and by means of the handle 18 the position of the rods is so fixed as to give to the paper a bend opposite to that which it has after leaving the roll.

Figure 5:
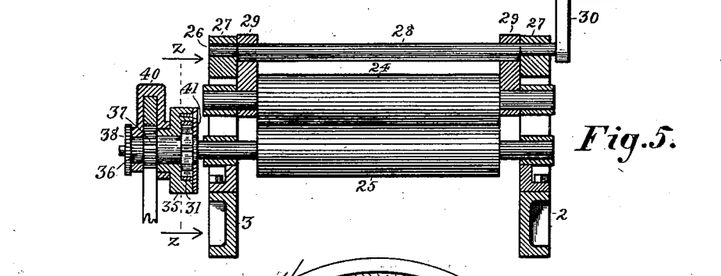
Fig. 5, a section at the line $y\ y$ of Fig. 3.

Mounted on the ends of the frames 2 and 3 and bolted thereto are two small housings 19 and 20. At the place where these two housings are placed on the main frame the main frame is cut out to permit the housings to sink below the common upper surface of the frames. Mounted in said housings in vertically-adjustable boxes are two cross-shafts 21, bearing scoring-rolls 22, rendered transversely adjustable on the shafts 21 by set-screws. These are forced against each other by set-screws 23, which serve to force down the upper scoring-rolls upon the lower ones. The object of these scoring-rolls is to impress upon the advancing strip of material longitudinal indentations at desired distances both from each other and from the edges of the paper and which are in this case illustrated by dotted lines K L M N in Fig. 11. Also mounted in the housings 19 and 20 are two feed-rolls 24 25. The shafts of these rollers are mounted in suitable boxes in said housing, and the upper roll 24 is capable of being raised from contact with the lower roll 25 by following mechanism, (shown best in Fig. 5:)

Directly above and in alinement with the axes of the feed-roller shafts is a small shaft 26, mounted in bearings in plates 27, which form the tops of the housings 19 20. Between its bearings this shaft 26 has an enlarged portion 28, which is eccentric to the axial line of those portions of the shaft which are in the bearings in the caps 27, and adjacent to the bearings of the shaft 26 are two vertical links 29, which inclose the eccentric portion of the shaft 26 and depending therefrom inclose the shafts of the upper feed-roller outside of the rollers 24.

Figure 6:
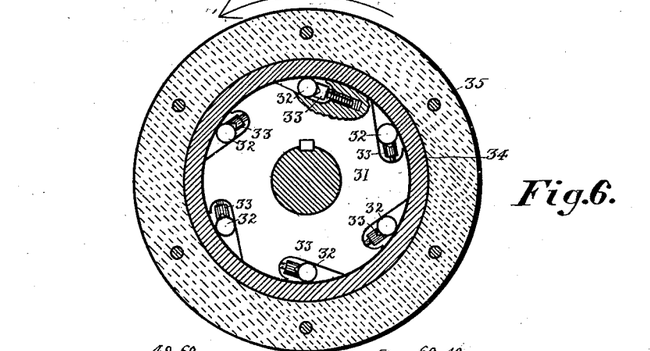
Fig. 6, a section at the line $z\ z$ of Fig. 5.

The shaft 26 is rotated by a crank-arm 30, so that a semirotation of the shaft 26 will cause, by means of the eccentric portion 28 and the links 29, a vertical movement of the upper feed-roller 24 to and from the lower roller 25, the object of this device being to permit a more accurate starting of the paper than would be possible were these feed-rollers held tightly against one another, as it will be seen that by slightly raising the roller 24 and inserting the advancing end of the strip of material between the rollers and placing it accurately in line and then forcing down the feed-roller 24 will cause a much more accurate result and be more easily accomplished than could possibly be done were the paper fed in between these rollers when held tightly against one another. The upper feed-roll 24 is caused to move in unison with the roller 25 simply by frictional engagement between it and the strip of advancing material. Motion is communicated to the lower roll 25 by means of a roller-clutch mounted on the left side of the shaft of said roller 25 outside of the frame. This roller-clutch is constructed as follows and is shown best in Figs. 5 and 6: Mounted on the shaft of the roller 25 and keyed thereto is the clutch proper, 31, which consists of a metallic cylinder having transverse slanting grooves cut in the periphery, in which grooves are mounted rollers 32 of equal width with the face of the cylinder 31. These rolls are pushed outwardly toward the periphery of the cylinder 31 by means of short spring-pressed bolts 33, having in their faces V-shaped grooves to engage the rollers and which rest in holes bored in the grooves in said cylinder. Surrounding the cylinder or clutch 31 is a steel ring 34, which forms the bushing or lining of the cup-shaped flanged member of the clutch 35. This member 35 is fastened, by means of a key or otherwise, to a sleeve 36, freely revoluble on the shaft of the roller 25, and is adapted to revolve with said sleeve. Mounted and tight therewith and, if desired, integral with the sleeve 36 is a spur-pinion 37. This sleeve is held from slipping off the end of the shaft of the roller 25 by means of a cap 38, fastened to the end of the shaft by a bolt.

In order to cause the rotation of the pinion 37, a connecting-rod 39 is provided, having at one end rack-teeth to engage said pinion and held in place by an elongated box 40, having depending perforated ears to inclose the pinion 37 and to be journaled on one side upon the sleeve 36 and on the other side upon the hub portion of the flanged member 35 of the clutch. Upon the opposite end of the flange 35 is a circular cap or cover 41, screwed to said flange. This cap 41 serves to keep the rollers 32 from slipping sidewise out of the grooves in the cylinder 31. It is therefore seen that a reciprocating motion communicated to the connecting-rod 39 will rotate the sleeve 36 and pinion 37 backward and forward loosely upon the shaft of the roller 25 and will cause the flange or outer member of the clutch to rotate in unison because of the fact that it is keyed to the sleeve 36, on which said pinion is mounted, and as said outer member of the clutch rotates in one direction the rollers 32 will bind between the steel ring 34 and the inclined faces of the grooves in the cylinder 31, causing the cylinder 31 and the shaft on which it is mounted (being the shaft of the roller 25) to move together, but that a movement in the other direction by the outer member of the clutch will release all the rollers 32 from engagement and will permit it to revolve freely.

A reciprocating motion is communicated to the connecting-rod 39 in the following manner: The lower end of said rod is perforated and through which perforation passes a bolt 42, which enters a threaded nut mounted upon a radial screw-threaded shaft 43, sunk in a groove in the face of a disk-wheel 44 upon the opposite end of the main driving-shaft 5 from the spur-gear 8. The stroke of the connecting-rod is made adjustable by means of the screw-threaded shaft 43, causing the nut on which is mounted the bolt 42, forming the pivot for the connecting-rod 39, being moved to and from the center of the disk-wheel 44.

Figure 3:
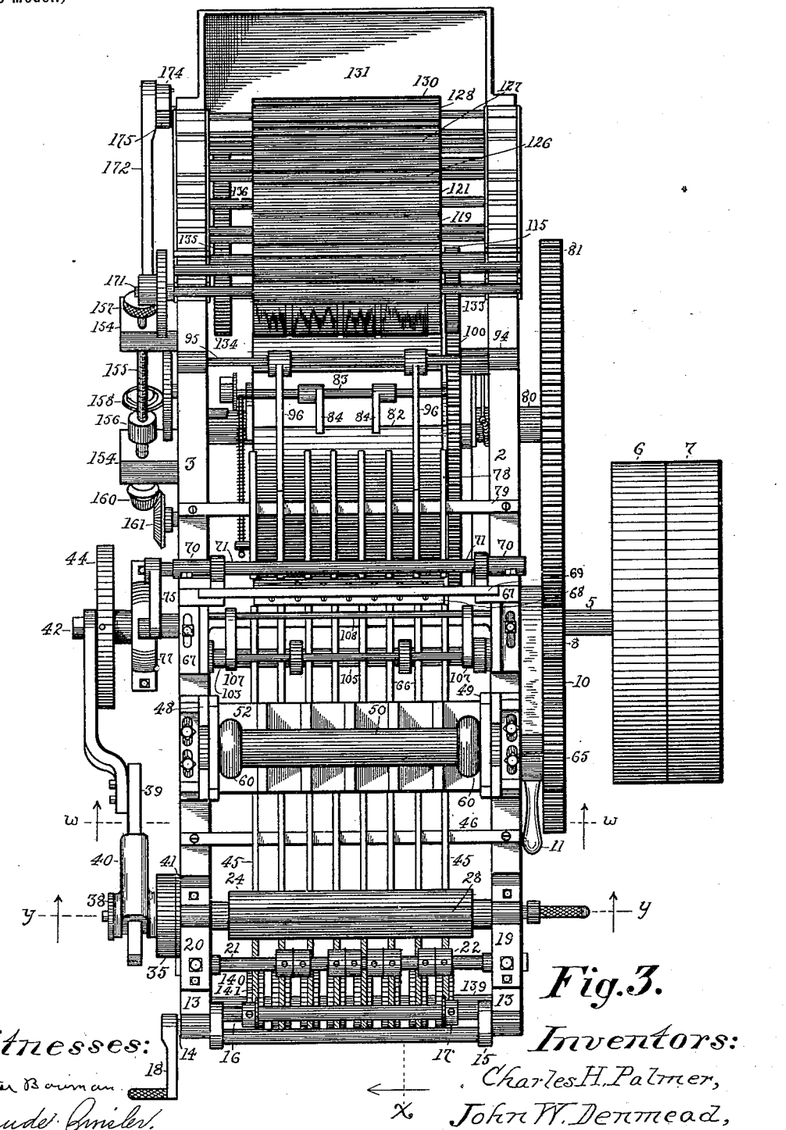
Fig. 3, a plan view of the same.
Figure 7:
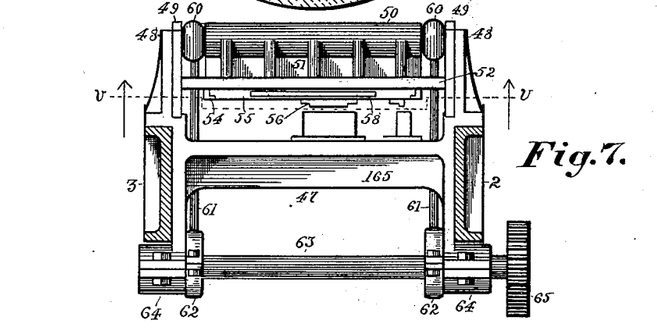
Fig. 7, a section at the line $w\ w$ of Fig. 3.
Figure 8:
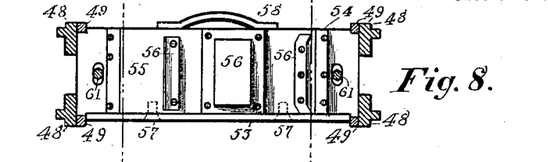
Fig. 8, a section at the line $v\ v$ of Fig. 7.

It will be seen from the foregoing that at each revolution of the disk-wheel 44 and movement of the connecting-rod 39 the lower feed-roll 25 will be caused to revolve a determined distance and that the distance which the strip of material passing between the feed-rolls is pushed forward can be ascertained with great accuracy. After leaving the feed-rolls the strip of advancing material passes over a series of slats 45, transversely supported by a cross-bar 46, extending between the sides of the frame of the machine. These slats serve to support the strip until it reaches the punch, which is the next step in the process and will now be described. The punch, which is best illustrated in Figs. 3, 7, and 8, consists of a housing 47, supported upon the horizontal portions of the main frames 2 3, and has projecting above the frames 2 3 upright portions 48, supported on the outer side by a web and bolted to the main frames by bolts passing through longitudinal slots to insure absolute adjustment. On the inner faces of these upright portions and facing each other are gibs 49, which serve as ways for the reciprocating cross-head, now to be described, to move in. The cross-head, which bears the punch, consists of a horizontal cylindrical portion 50, from which depends a central web 51, which terminates in a horizontal plate 52. Between the plate 52 and the cylindrical portion 50 are a number of strengthening-ribs. At one side of the plate 52 and integral therewith is a depending strip 53, and also mounted on the under face of said plate 52 are transverse gibs or sliding ways 54. Sliding in the ways 54 is a plate 55, bearing on its under surface a series of punches 56. These punches are of any desired configuration and are adapted and placed with reference to the description of blank required to be produced by the machine.

In the illustration shown in Fig. 8 three punches are shown arranged to produce the cut-away portion A, (see Fig. 11,) the opening B, and the longitudinal cut C. The plate 55 is slid into the gibs 54 and is held in place by a pair of screws 57, passing through the depending strip of the plate 52, and are drawn snugly and accurately against this strip, which trues them in position.

When it is desired to remove the punches for sharpening or other causes, we use the handle 58, which is placed on the plate 55, and after loosening the screws 57 the removal of the plate 55 and its accompanying punches is rendered extremely easy.

Figure 4:
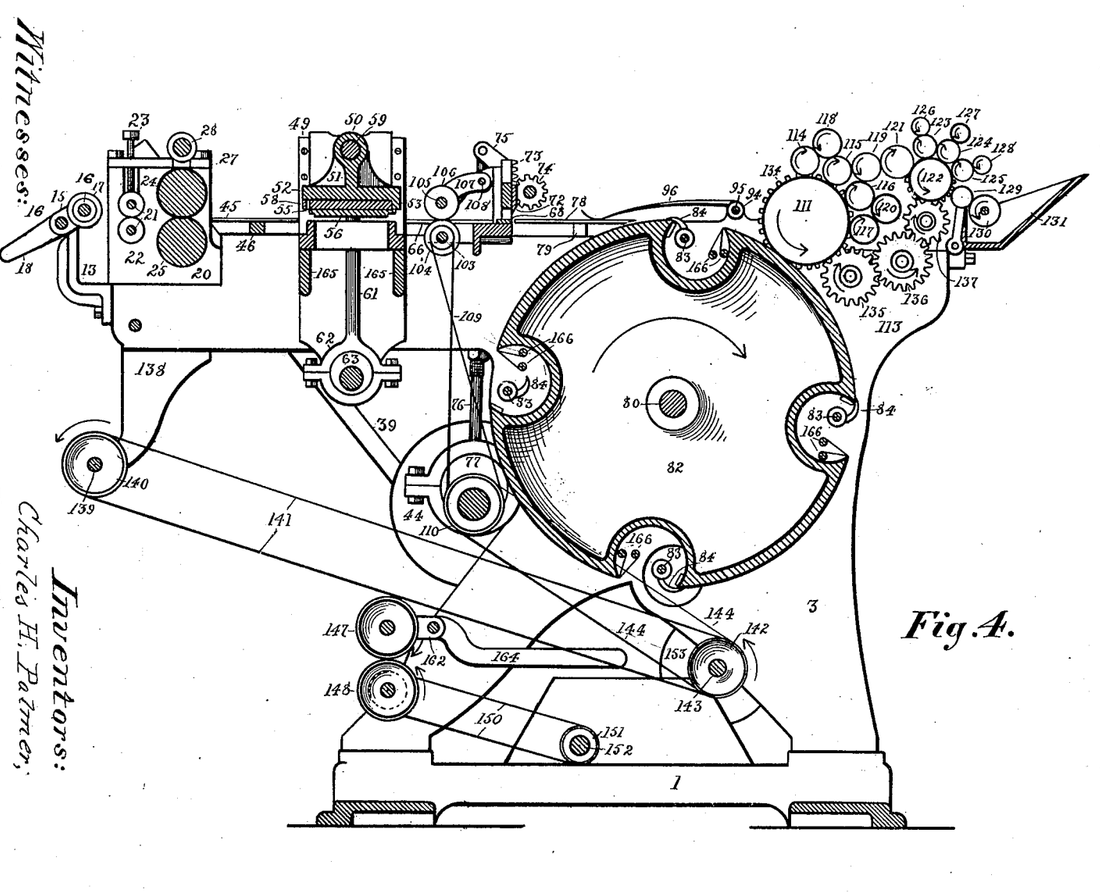
Fig. 4, a section at the line $x$ of Fig. 3.

The ends of the plate 52 are adapted to rest against the upright portions 48 of the housing 47 and to play between the gibs 49. The reciprocating motion of the punch is secured in the following manner:

Through the cylindrical portion 50 of the punch-head passes a shaft 59, (see Fig. 4,) on the ends of which are two heads 60 of connecting-rods 61, whose lower ends terminate in eccentrics 62, mounted upon the shaft 63, carried in boxes 64, attached to the depending lower portions of the housing 47. On the end of the shaft 63 is a spur-wheel 65, which is arranged to mesh with the idler 10, which in turn is driven by the spur-pinion 8 on the main driving-shaft 5 of the machine.

Across, between, and integral with the housing 47 below the punch-head are a pair of arms 165, (see Figs. 7 and 4,) upon which are mounted dies into which the punches 56 work.

The housing 47 is capable of being slid along the upper surfaces of the frames 2 3 to secure the desired distance from the other mechanism in the machine and to produce the desired punches in the advancing strip of material at the required distances apart. This is secured by the slots surrounding the bolts by which the housing 47 is fastened to the upper surfaces of the frames 2 3, and in order to convey motion to the spur-wheel 65 when the position of the housing 47 is changed the bolt 12 is loosened and the pivoted bracket 9, bearing the idler 10, is raised or lowered until the idler 10 is in perfect mesh with the spur-gear 65. It will be noted here that the size of the pinion 8 is exactly the same as that of the spur-gear 65, so that the same speed of revolution is maintained in the spur-gear 65 as is maintained by the pinion 8. After the strip of material has received the operation of the punch just described it passes over a series of slats 66 (see Fig. 3) to the shear, now to be described.

Mounted on the same upper faces of the frame 2 3 as the housing 47 of the punches are bolted two upright brackets 67 by bolts passing through slots in said brackets 67 to permit the shear to be adjusted to a proper position. These brackets are connected by a plate bearing on their upper faces a cutter-bar 68. In the upright portions of the bracket 67 are cut-away portions or parts furnishing ways for a vertically-reciprocating knife-frame 69, the brackets being cut away to form the ends and one side of the ways, and the third side of the ways is furnished by the overlapping bases of two journal-boxes 70, which are bolted to the upright brackets and bear a transverse shaft 71. In the ways thus formed reciprocates the knife-frame 69, bearing at its lower portion a knife 72 and which is arranged when depressed to bear slightly against the cutter-bar 68. Along the sides of the boxes 70 and parallel therewith are two racks 73, fastened by screws or otherwise to the knife-frame 69. Mounted upon the shaft 71 are two spur-pinions 74, arranged to engage and mesh with the racks on the knife-frame 69. On the left end of the shaft 71 is a crank-arm 75, adapted to be rocked by an adjustable connecting-rod 76, actuated by an eccentric 77 on the main driving-shaft 5 of the machine outside of the frame 3 and in close proximity to the disk-wheel 44.

It will be seen from the foregoing that at each rotation of the main driving-shaft 5 the eccentric will cause the crank-arm 75 to rise and fall, causing a partial rotation of the shaft 71, thereby lowering the knife past the cutter-bar by means of the spur-pinions 74, engaging the rack 73 on the knife-frame, thus shearing the strip of material completely across at this point in its progress.

Figure 11:
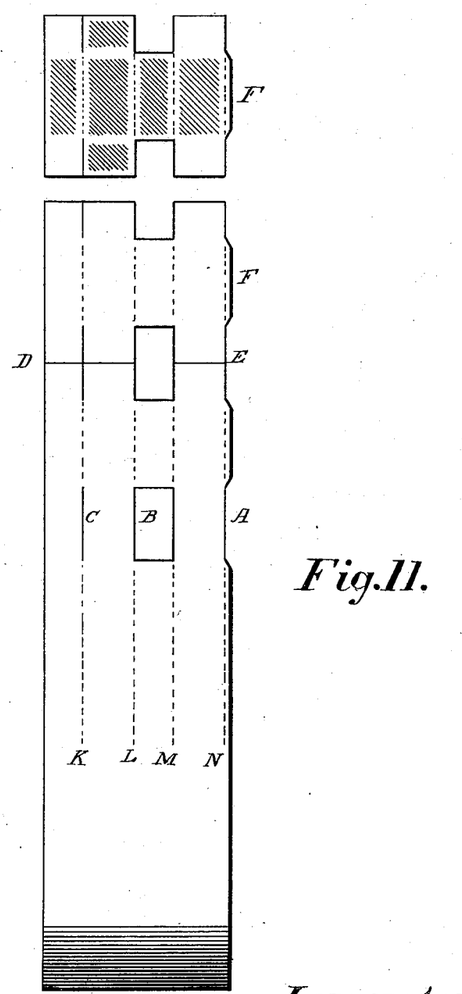
Fig. 11, a diagrammatic view showing the cuts, scores, and impressions made on the strip of advancing material during its progress through the machine.

In Fig. 11 the line D E indicates the cut of the knife 72 through the strip of advancing material. It will be observed that the position of this cut is across the longitudinal center of the punch-marks which have just previously been made, so that at each cut a complete blank is severed, with both ends alike, without recourse to further knife or punch operations.

Mounted between the brackets 67 of the knife-frame is a shaft 103, situated below the line of paper and bearing two friction-rolls 104, and immediately above this shaft is suspended another shaft 105, bearing corresponding friction-rolls 106, adapted to rest on said rolls 104 and to turn therewith. The shaft 105 is suspended by a pair of brackets 107 from a cross-shaft 108, mounted between the brackets 67. The lower shaft 103 is driven rapidly by means of a belt 109 from a pulley 110 on the main driving-shaft 5.

The object of the rolls 106 and 104 is that as the paper leaves the punch it is apt to become wrinkled or "buckled" and will not feed forward smoothly toward the knife; but with this improvement, as the under roller 104 is constantly revolving whether the paper moves forward or not and the weight of the upper roller 106, with its connected parts, presses firmly down thereon, it will cause the paper to be stretched forward in the direction of the knife and take out any unevenness or wrinkles that might otherwise exist. During the intervals when the paper is not advancing the under roller is constantly running; but the upper roller only rotates as the paper advances and is driven by frictional engagement only.

It will be noted at this point that the cut made by the knife 72 is made simultaneously with the downward movement of the punches 56 and that these two movements are made during the interval when the paper is not being fed forward by reason of the backward stroke of the connecting-rod 39 reversing the clutch 31.

As stated, the cut of the knife 72 is indicated on the diagrammatic view in Fig. 11 by the line D E, and the severed portion F will have advanced far enough beyond the knife to become engaged by the nippers on the drum, now to be described.

After the cut by the knife 72 the detached blank F rests on a series of slats 78, mounted on a transverse bar 79, which supports it in its passage from the knife to the printing mechanism, which follows its separation from the advancing strip of material.

Mounted on the main part of the frames 2 3 is a shaft 80, provided with suitable boxes in said frame and bearing on its outer right-hand end a spur-gear 81, arranged to mesh with the pinion 8 and provided with a multiple of the number of teeth on the pinion 8, so that at each revolution of the pinion 8 the gear 81 and shaft 80 will make an exact determinate fraction of a revolution.

Mounted on the shaft 80 between the housings 2 3 and separated therefrom a short distance is an impression-drum 82, now to be described. This drum consists of a hollow cylinder, usually closed at both ends and bored centrally to receive the shaft 80. In the surface or periphery of this drum are a number of transverse openings extending across its entire surface and the number of which is so determined that as the blanks are fed from the slats 78 each advancing blank will occupy a space between the transverse openings on the surface. Extending through these openings in the drum and mounted in bearings 85 at either end are shafts 83, bearing collars, generally two in number, provided with slender curved fingers, hereinafter designated as "nippers" 84. The shafts 83 are placed at such a distance from one of the edges of these openings in the drum that when the nippers are revolved with the shafts 83 they will slightly overhang and press upon a small portion of the outer circumference of the drum or upon a blank when fed forward upon this surface and cause said blank to revolve with said drum until the pressure of said nippers thereon is released by suitable means. The mechanism to cause said nippers to press upon said blank or to recede therefrom is as follows: Mounted on the shafts 83 outside of the bearings 85 are short crank-arms 86, (see Fig. 9,) to which are attached rods 87, whose other ends pass through posts 88, set in the end of the drum 82 and each of which bears springs 89 whose constant tendency is to force the rods 87 away from the posts 88. On the left ends of the shafts 83 are heads 90, each of which is provided with deeply-cut radial grooves 91, the object and purpose of which is to aid in causing the nippers to press upon the outer surface of the drum and to recede therefrom. Projecting from the inner side of the frame 3 are two pins 92 93, so placed as to engage the advancing ends of the grooves 91 when turned in the proper direction.

Figure 9:
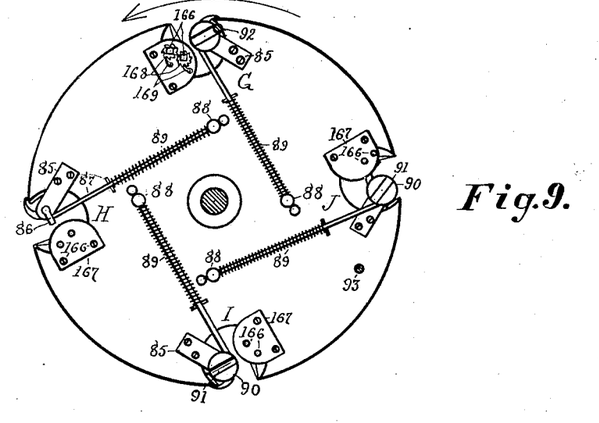
Fig. 9, an elevation of the side of the drum toward the observer in Fig. 2.

In the view shown in Fig. 9 four pairs of nippers are shown in the positions G H I J. The position G is that resulting from encountering the pin 92, which causes the nippers to engage the surface of the drum, and the nippers will retain this position until they reach the pin 93, whose position is indicated in Fig. 9, and the advancing end of the groove 91 in each head 90 will have this position after passing the pin 92. As soon as the lower advancing end of the groove 91 encounters the pin 93 it will partially straddle the pin, and as the pin cannot pass upward in said groove the head 90 will be partially rotated on its shaft, throwing the crank 86 around on the shaft to the other side into the position shown by the letter J, and this position will be retained with the nippers out of engagement with the surface of the drum until the now-advancing upward end of the groove 90 will encounter the pin 92, which will reverse the movement just caused by the pin 93 and cause the parts to assume the position indicated by the letter G. At the time that the knife 72 makes the cut across the strip of material and severs the blank therefrom the front edge of the blank will be substantially coincident with the edge of the top opening of the drum and within reach of the nippers operating in said opening; but as the nippers will not take hold for an instant immediately following the cut of the knife suitable means must be provided to retain the blank securely on the slats 78 above the drum until the nippers can take a firm grasp of said blank.

Figure 10:
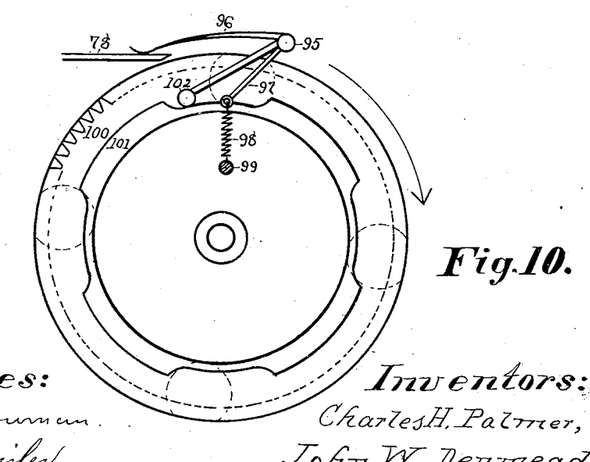
Fig. 10, a view of the opposite end of the drum shown in Fig. 9.

Across the frame and mounted in suitable bearings 94 is a shaft 95, bearing downwardly-pressing spring-fingers 96, whose outer ends bear upon any of the slats 78. (See Fig. 10.) In order to cause these fingers to press down at desired intervals and to raise from said slats when wished, the following mechanism is employed: In shaft 95 is mounted a finger 97, to which is attached a spring 98, attached to a post 99 on the inside of the frame 2. The constant tendency of this spring is to pull downward the spring-fingers 96 upon the slats 98. On the drum-shaft 80 and either made integral or fastened rigidly on said shaft is a gear 100, on the outer face of which is a cam-ridge 101, upon which ridge rides a roller 102, mounted on an arm attached to said shaft 95, and by which means the shaft 95 is partially rotated upward, causing the spring-fingers 96 to rise from the slats 98. It is the intention to have said spring-fingers 96 press upon the blank during the process of severing it from the advancing strip of material and to release said pressure immediately after the seizing of said blank by the nippers 84.

The outer surface of the drum 82 is padded between the transverse grooves in the following manner: On the inner side of the groove adjacent to the shaft 83 is a strip of material screwed or bolted to the sides of the grooves and between which and the grooves are placed a number of sheets of heavy paper suitable for the padding of an impression-drum. These are carried along over the surface of the drum until their ends are turned around into the next succeeding groove and are passed around suitable cross-shafts 166. These cross-shafts (see Fig. 9) are supported in brackets 167, screwed to the outside of the drumheads and have on one end ratchets 168 and pawls 169, by which the tension of the paper on the surface of the drum may be regulated. As soon as the nippers 84 have seized upon the forward end of the blank it is drawn forward by the constantly-revolving drum 82, and during its rotation therewith it passes under and is printed by a form-roller 111, bearing suitable printing-type, electrotypes, engravings, or similar ornamentation. This form-roller is mounted upon a pair of brackets 112, which have therein ways radial to the drum for boxes for the shaft of said form-roller. This form-roller receives ink in the following manner, and it may not be inadvisable to say at this point that any number of form-rollers carrying different colors of ink may be arranged to print their respective colors upon the blanks passing around the drum; but as one set of printing mechanism will serve to illustrate the idea only one set is shown. Below the brackets 112 and to the right in Fig. 1 frames 2 3 project horizontally to form a shelf 113, upon which is mounted a housing 132, in which is mounted the inking-rollers. The first set 114 115 116 117 are adapted to bear directly upon the type upon the form-roller and are what are known as "composition" rolls. Between rollers 114 and 115 is roller 118, and between 115 and 116 is roller 119, and between roller 116 and 117 is roller 120, whose object is to more evenly distribute ink on rollers 114 115 116 117. Projecting from the journal-box of roller 119 are slight depending brackets, holding a roller 121, by which ink is conveyed from what is known as the "vibrating" roller 122. This vibrating roller is surrounded by three rolls 123, 124, and 125, each of which has a distributing-roller mounted in the housing above it and numbered, respectively, 126, 127, and 128. Ink is distributed to the vibrating roller 122 by a ductor-roll 129, which receives ink from an ink-roller 130, partially submerged in ink in an ink-vat 131, attached to the housing 132. The form-roller is driven by means of a gear 133, mounted on the same shaft and meshing into the gear 100 at the side of the drum 82. On the opposite end of the form-roller shaft is a gear 134, which meshes into gear 135, mounted on a pin in the housing 3 on the inside thereof. This gear 135 in turn drives gears 136 and 137, similarly mounted, which in turn mesh into a gear on the shaft of the vibrating roll 122 and by which means the vibrating roll is rotated. (See Fig. 4.) The rotation of the partially-submerged ink-roll 130 within the ink-vat 131 is obtained in the following manner: On the left end of the shaft of the form-roller 111 is placed a crank-wheel 170, having a crank-pin 171 projecting therefrom, on which is attached the hooked end of a connecting-rod 172, which operates at its opposite end a rocking arm 173. This rocking arm rides loosely on the shaft of the ink-roller 130 and bears on one side a pawl 174, arranged to engage and rotate a ratchet-wheel 175, tight on the shaft of the ink-roller 130. The rotation of the form-roller is adapted to cause at each movement a partial rotation by means of this mechanism of the ink-roller. After the blank has passed around and received the necessary printing from the form-roll it is carried to the under part of the drum, where the nippers release it by means of mechanism hereinbefore described, whence it falls upon a series of slightly-separated bands passing under said drum and supported as follows: Journaled in brackets 138, depending from the left-hand lower end of the frames 2 and 3, is a shaft 139, on which are mounted a series of pulleys 140, over which pass a number of belts 141, which also run over similar pulleys 142, mounted on a shaft 143 in the lower portion of the frames 2 and 3. This shaft 143 receives motion by means of a belt 144 passing over a pulley of the desired size mounted on the main driving-shaft of the machine. These belts 141 are designed to run in the direction indicated by the arrows and to run constantly and to receive and carry forward the completed blanks falling from the drum-surface and deposit them on any convenient place and from which they are removed as desired.

Figure 2:
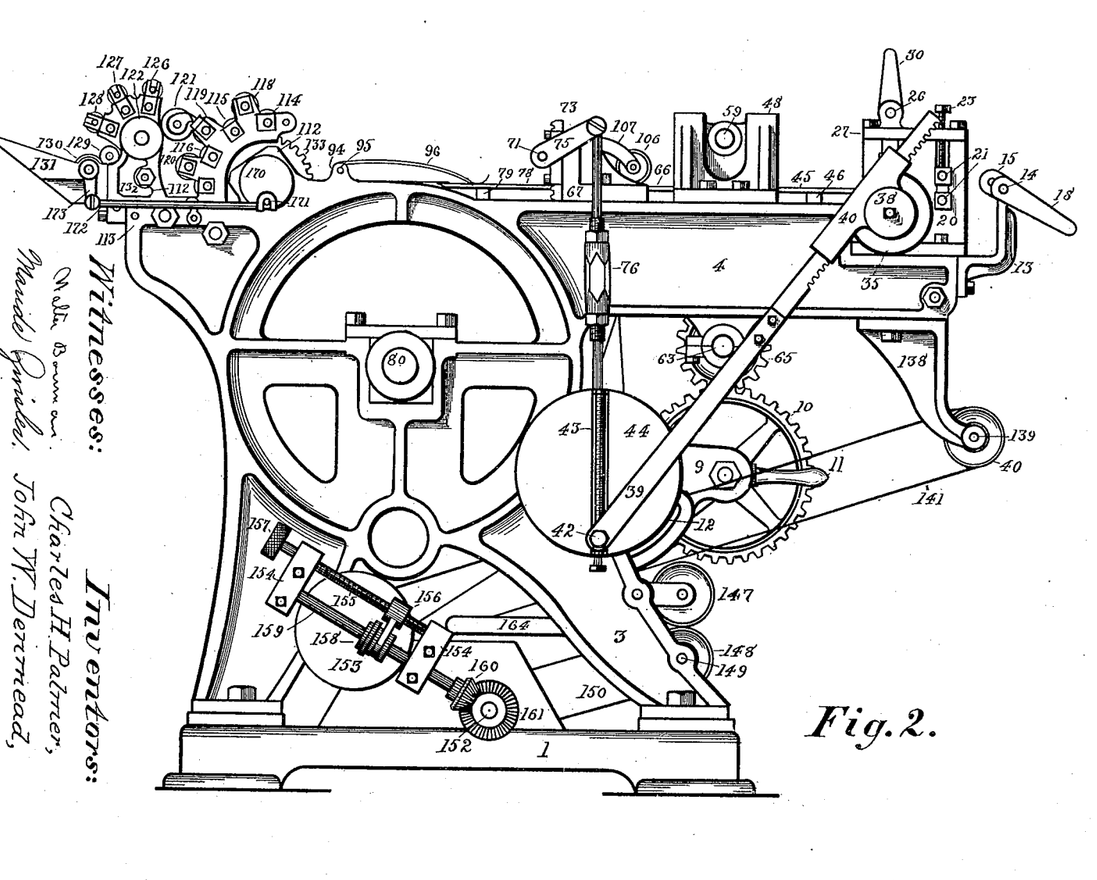
Fig. 2, a side elevation of the opposite side of said machine.

We find it preferable to feed the paper from a roll, as 146, situated on the right side of the machine between the legs of the frames 2 and 3, to the left and up and between the rods 16. In doing so it frequently is found in practice that by reason of the tightness of the roll of paper it has a constant tendency to tighten the paper and place too much tension thereon. It is therefore deemed best to run the strip of paper or material between two sets of rolls 147 and 148. The rolls 148 are mounted on a shaft 149, and extending between frames 2 and 3 in the lower portion thereof and are driven by a belt 150 from a pulley 151 on a shaft 152, mounted in brackets on the lower bed-plate 1 of the machine, reference being had to Fig. 2 of the drawings. On the left end of the shaft 143 is a plain-faced disk wheel 153, on either side of which are brackets 154, bearing between them a screw-threaded shaft 155, on which travels a nut 156, operated by a hand-wheel 157 at the upper end of the shaft 155. From the nut 156 extends an arm adapted to engage and inclose the hub of a friction-wheel 158, the surface of which is constantly in contact with the revolving face of the disk wheel 153. This friction-wheel 158 is mounted on a shaft 159, parallel with the shaft 155, and this shaft 159 bears at its lower end a bevel-pinion 160, which meshes into a bevel-gear 161 on the end of the shaft 152. Consequently when the shaft 143 is rotated the disk 153 moves in unison therewith and rotates the friction-wheel 158, the shaft 159, the bevel-pinion 160, and the bevel-gear 161, thereby revolving shaft 152, which in turn drives the pulleys 151 and the belt 150, causing the movement of the rolls 148. The rolls 147 are mounted on the ends of links 162, which are pivoted on a shaft 163, mounted in the frames 2 and 3. Attached to this shaft 163 is a lever 164, to be actuated either by hand or foot and the depression of the free end of which will cause a separation between the rollers 147 and 148.

The object of raising the roller 147 from engagement with the upper surface of the strip of material passing over the roller 148 is that it has been found in practice that at times the feeding forward of the strip of material from the rollers 147 and 148 will be more rapid than the consumption of the material in the machine, and therefore more paper is thrown forward than the operation of the machine requires rotating at a given speed, and when this occurs proper tension upon the paper is lacking, and hence this difficulty is overcome by depressing the end of the lever 164, which raises the roller 147 and prevents the feeding forward of the paper by the roller 148, and in placing a new roll of material in position the advantage of being able to separate the rolls is apparent.

Should it happen that the feed of the rollers 147 and 148 is not fast enough, it may be made adjustable by rotating the hand-wheel 157, thereby moving the nut 156 and the friction-wheel 158 farther from the center of the disk wheel 153, thereby increasing the speed of the shafts 159 and 152.

It is thought that the operation of the machine is clear from the description heretofore given of the successive operations involved in producing the different steps in the process and operation of the machine.

What we therefore claim, and desire to secure by Letters Patent, is—

1. A machine for the manufacture and printing of blanks involving a rotating impression-drum, a suitably-inked form-roller to bear on the periphery of said drum, devices for feeding paper in a continuous strip forward, suitable mechanism for punching and shearing said continuous strip before reaching said drum, said punching and shearing mechanism being adjustable with relation to each other and to said drum, and means to convey operating power to said shearing and punching mechanism, substantially as shown and described.

2. In a machine of the class described consisting of an impression-drum, a suitably-inked printing-roller to convey impressions onto blanks passing around said drum, a paper-straightener adapted to receive the paper in a continuous strip from a roll and remove any bends therein, scoring-rolls to impress longitudinal indentations on said strip of material, a pair of feed-rollers adapted to be operated intermittingly by means of a roller-clutch and punching and shearing devices to operate on said strip of material, substantially as shown and described.

3. A machine for the manufacture and printing of blanks involving a rotating impression-drum, a suitably-inked form-roller to bear on the periphery of said drum, devices for feeding paper in a continuous strip forward, suitable mechanism for punching and shearing said continuous strip before reaching said drum, said punching and shearing mechanism being arranged to act simultaneously, said punching and shearing mechanism being adjustable with relation to each other and to said drum, and means to convey operating power to said shearing and punching mechanism, substantially as shown and described.

4. In a machine of the class described consisting of an impression-drum, a suitably-inked printing-roller to convey impressions onto blanks passing around said drum, a paper-straightener adapted to receive the paper in a continuous strip from a roll and remove any bends therein, scoring-rolls to impress longitudinal indentations on said strip of material, a pair of feed-rollers adapted to be operated intermittingly by means of a roller-clutch, means as an adjustable pivoted connecting-rod for determining the stroke thereof, and punching and shearing devices to operate on said strip of material, substantially as shown and described.

5. In a machine of the class described consisting of an impression-drum, a suitably-inked printing-roller adapted to make impressions upon blanks passing around said drum, a reciprocating punch to operate on a strip of paper, a die-plate on said punch, sliding ways mounted on the under face of said die-plate, a depending integral strip on said die-plate, a plate bearing a series of punches to slide in said ways and abut against said depending strip, fastening devices to retain said last-named plate firmly against said strip, and a handle on said punch-bearing plate to remove the same when desired, substantially as shown and described.

6. In a machine of the class described consisting of an impression-drum, a suitably-inked printing-roller to convey impressions onto blanks passing around said drum, scoring-rolls to produce indentations on an advancing strip of material, intermittingly-operated feed-rolls to feed forward said strip, a reciprocating cross-head, a removable punch bearing a plate slidably attached to said cross-head to produce impressions or cuts on said strip of material, substantially as shown and described.

7. In a machine of the class described consisting of an impression-drum, a suitably-inked printing-roller to convey impressions onto blanks passing around said drum, a paper-straightener adapted to receive the paper in a continuous strip from a roll and remove any bends therein, scoring-rolls to impress longitudinal indentations on said strip of material, a pair of feed-rollers adapted to be operated intermittingly by means of a roller-clutch, a series of slats to receive and sustain said paper after leaving said rollers, punching mechanism to operate on said strip of material intermittingly, slats to convey said strip from said punching device, a shearing device to sever said strip of material and a series of slats to convey and sustain said material from said shearing device to said drum, substantially as shown and described.

8. A machine for the manufacture and printing of blanks involving a rotating impression-drum, a suitably-inked form-roller to bear on the periphery of said drum, devices for feeding paper in a continuous strip forward, suitable mechanism for punching and shearing said continuous strip before reaching said drum, said punching and shearing mechanism being adjustable with relation to each other and to said drum, and means to convey operating power to said shearing and punching mechanism, a series of slats to receive the severed pieces of material between the shearing mechanism and the impression-drum, a number of spring-fingers adapted to press upon said material while on said slats during and immediately following said shearing operation, and a cam-operated arm to operate said spring-fingers, substantially as shown and described.

9. The combination in a machine for the manufacture and printing of blanks involving a rotating impression-drum, devices for feeding paper in a continuous strip forward, two series of feeding-rolls for feeding forward a strip of material at a definite speed, one series whereof is capable of regulation as to speed, the other series being mounted on a shaft having an eccentric portion and capable of being rotated to cause a separation between said series, a lever adapted to rotate said upper shaft and cause such separation, substantially as shown and described.

10. The combination in a machine of the class designated, of rotating printing devices, a frame to sustain said printing devices, horizontal brackets projecting from said frame, a housing for punching mechanism adjustably mounted on said brackets, a gear mounted in said housing, a main driving-shaft mounted in the frame of said machine, a gear mounted thereon, and an adjustable gear adapted to mesh with the gear of the main shaft and the gear in said housing wherever said housing is located on said brackets, substantially as shown and described.

11. The combination in a machine for printing paper blanks for boxes, of a rotating printing device, a frame to sustain said printing device, horizontal brackets projecting from said frame, and an adjustable shear mechanism mounted on said brackets, a housing to sustain said shear, a pair of rack-teeth on said shear, a transverse shaft mounted in the housing of said shear, pinions mounted on said transverse shaft to mesh in said rack-teeth, a crank mounted on the end of said transverse shaft, a longitudinally-adjustable connecting-rod attached to said crank and means to cause the reciprocation of said connecting-rod, substantially as shown and described.

In testimony that we claim the above we hereunto set our hands in the presence of two subscribing witnesses.

CHARLES H. PALMER.
JOHN W. DENMEAD.

In presence of—
F. S. NEWTON,
W. C. FINDLEY.